US012673686B2

(12) United States Patent
Wiberg et al.

(10) Patent No.: US 12,673,686 B2
(45) Date of Patent: Jul. 7, 2026

(54) CONTROL SYSTEM AND METHOD FOR MANOEUVRING AN AUTOMATED VEHICLE

(71) Applicant: Volvo Autonomous Solutions AB, Gothenburg (SE)

(72) Inventors: Wilhelm Wiberg, Askim (SE); Oskar Ljungqvist, Sätila (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 265 days.

(21) Appl. No.: 18/068,740

(22) Filed: Dec. 20, 2022

(65) Prior Publication Data

US 2023/0192102 A1 Jun. 22, 2023

(30) Foreign Application Priority Data

Dec. 20, 2021 (WO) .................. PCT/EP2021/086846

(51) Int. Cl.
*B60W 50/00* (2006.01)
*B60W 30/08* (2012.01)
(Continued)

(52) U.S. Cl.
CPC ........ *B60W 50/0098* (2013.01); *B60W 30/08* (2013.01); *B60W 30/18027* (2013.01); (Continued)

(58) Field of Classification Search
CPC ............. B60W 50/0098; B60W 30/08; B60W 30/18027; B60W 30/18036; B60W 2420/403; B60W 2520/10; G06V 20/588
See application file for complete search history.

(56) References Cited

U.S. PATENT DOCUMENTS 5,754,123 A 5/1998 Nashif et al.
2015/0203081 A1* 7/2015 Paulson .................... B60T 8/58
701/70
(Continued)

FOREIGN PATENT DOCUMENTS

DE 102013210263 A1 12/2014
DE 102019205900 A1 10/2020
WO 2020123135 A1 6/2020

OTHER PUBLICATIONS

European Search Report dated May 11, 2023 in corresponding European Patent Application No. 22212977.7, 8 pages.
(Continued)

*Primary Examiner* — Bryce P Bonzo
(74) *Attorney, Agent, or Firm* — Jeffri A. Kaminski; Venable LLP

(57) ABSTRACT

The disclosure relates to a control system for manoeuvring an automated vehicle, wherein the control system comprises one or more obstacle detection sensors which are configured to detect if an intended travelling path of the automated vehicle is free from obstacles or not during manoeuvring of the automated vehicle, and wherein the control system is further configured to utilize a plurality of predefined obstacle detection modes during manoeuvring of the automated vehicle, wherein the plurality of predefined obstacle detection modes have different levels of obstacle detection accuracy, wherein, the control system is further configured to select a specific obstacle detection mode from the plurality of predefined obstacle detection modes based on a specific driving mission and/or based on a specific area of operation for the automated vehicle so that the specific obstacle detection mode is used during the specific driving mission and/or in the specific area of operation.

25 Claims, 3 Drawing Sheets

(51) Int. Cl.
    *B60W 30/18*         (2012.01)
    *G06V 20/56*         (2022.01)

(52) U.S. Cl.
    CPC ..... *B60W 30/18036* (2013.01); *G06V 20/588*
        (2022.01); *B60W 2420/403* (2013.01); *B60W*
        *2520/10* (2013.01)

(56)            References Cited

U.S. PATENT DOCUMENTS

| 2019/0087667 | A1* | 3/2019 | Foroughi | G06V 20/58 |
| 2019/0327415 | A1* | 10/2019 | Prabhakar | H04N 23/667 |
| 2020/0209403 | A1* | 7/2020 | Sunil Kumar | G01S 7/4817 |
| 2020/0339151 | A1 | 10/2020 | Batts et al. | |
| 2022/0126832 | A1* | 4/2022 | Ewert | B60W 10/24 |

OTHER PUBLICATIONS

International Search Report and Written Opinion in corresponding International Application No. PCT/EP2021/086846 mailed Aug. 1, 2022 (14 pages).
European Communication pursuant to Article 94(3) EPC dated Aug. 5, 2025 in corresponding European Patent Application No. 22212977. 7, 7 pages.

* cited by examiner

CONTROL SYSTEM AND METHOD FOR MANOEUVRING AN AUTOMATED VEHICLE

TECHNICAL FIELD

The invention relates to a control system for manoeuvring an automated vehicle. The invention further relates to a method for manoeuvring an automated vehicle, a control unit, a vehicle, a computer program and to a computer readable medium.

The invention can be applied in heavy-duty vehicles, such as trucks, buses and construction equipment. Although the invention will be described with respect to a truck, the invention is not restricted to this particular vehicle, but may also be used in other vehicles such as passenger cars and working machines.

BACKGROUND

An automated vehicle can be defined as a vehicle which can be manoeuvred automatically along desired travelling paths. The automated vehicle is generally equipped with a number of environment perception sensors, or obstacle detection sensors, which are used to perceive the environment around the vehicle during use.

Input from the sensors can be used for the manoeuvring. For example, if an obstacle is detected which is obstructing the desired travelling path, the vehicle may, based on the information from the sensor(s), perform an additional vehicle manoeuvre for avoiding a collision with the obstacle.

A current trend is the development and use of automated vehicles for confined areas, such as mining sites, logistics centres, ports etc. When driving in confined areas, a simpler sensor set up may be used compared to if the vehicle were to be driven in public road networks. A reason for this is that when driving in a confined area, the environment is known to a further extent. For example, when driving in public road networks, anything needs to be detected. On the other hand, when driving in confined areas, different types of obstacles may be narrowed down to a reduced number of different obstacle types. In other words, there are typically fewer types of possible obstacles in a confined area.

However, even though a simpler sensor set up may be used for automated vehicles in confined areas, it is still necessary to equip the vehicle with several sensors so that all areas around the vehicle are covered by the sensors. For example, during a reversing manoeuvre, the area behind the vehicle needs to be covered by the sensors. Accordingly, the automated vehicle should typically be equipped with both forward and rearward directed sensors in order to be adapted for both forward and reverse movement. As another example, during start up from standstill, the area closest to the vehicle also needs to be covered by the sensors. Therefore, the sensors may also need to be directed downwardly to cover the area closest to the vehicle. As a consequence, even when intended for operating in confined areas, automated vehicles need to be equipped with several sensors in order to cover all areas around the vehicle.

SUMMARY

In view of the above, an object of the invention is to provide an improved control system for manoeuvring an automated vehicle which at least partly alleviates one or more drawbacks of the prior art, or which at least is a suitable alternative. A further object of the invention is to provide an improved method for manoeuvring an automated vehicle which at least partly alleviates one or more drawbacks of the prior art, or which at least is a suitable alternative. Yet further objects of the invention are to provide an improved control unit, a vehicle, a computer program and a computer readable medium, which at least partly alleviate one or more drawbacks of the prior art, or which at least are suitable alternatives.

Thus, there is provided a control system for manoeuvring an automated vehicle, wherein the control system comprises one or more obstacle detection sensors which are configured to detect if an intended travelling path of the automated vehicle is free from obstacles or not during manoeuvring of the automated vehicle, and wherein the control system is further configured to utilize a plurality of predefined obstacle detection modes during manoeuvring of the automated vehicle, wherein the plurality of predefined obstacle detection modes have different levels of obstacle detection accuracy.

The control system is further configured to select a specific obstacle detection mode from the plurality of predefined obstacle detection modes based on a specific driving mission and/or based on a specific area of operation for the automated vehicle so that the specific obstacle detection mode is used during the specific driving mission and/or in the specific area of operation.

Obstacle detection modes with different levels of obstacle detection accuracy means that the obstacle detection accuracy varies between the different modes. For example, a mode with a relatively low level of obstacle detection accuracy may be configured to not detect all possible obstacles obstructing the intended travelling path, but may rather be configured to disregard certain types of obstacles and/or certain areas close to the vehicle. On the other hand, a mode with a relatively high level of obstacle detection accuracy may be configured to detect all, or almost all, types of possible obstacles which may obstruct the intended travelling path. Obstacle detection accuracy may be defined as a level of accuracy associated with the probability that an obstacle is present or not present nearby the automated vehicle along the intended travelling path.

By the provision of a control system as disclosed herein, a more versatile and efficient operation of the automated vehicle is achieved. In addition, a cost-effective control system is achieved since fewer obstacle detection sensors may be used. For example, it has been realized that for some driving missions, and/or in some areas of operation, the automated vehicle may suffer from using an obstacle detection mode with a relatively high level of obstacle detection accuracy. As such, by configuring the control system so that an obstacle detection mode with a lower level of obstacle detection accuracy is used for such driving missions and/or areas of operation, a more efficient operation of the automated vehicle can be achieved without using too many obstacle detection sensors.

For example, by selecting an obstacle detection mode with a lower level of obstacle detection accuracy, a deadlock situation where the automated vehicle is prevented from continuing its driving mission may be avoided.

Furthermore, by selecting an obstacle detection mode with a higher level of obstacle detection accuracy for other driving missions and/or areas of operation, a more efficient operation may be achieved, e.g. the control system may allow a higher maximum speed.

In view of the above, a more versatile, efficient and cost-effective operation of the automated vehicle can be achieved.

A driving mission as used herein shall be interpreted broadly and may be defined as a driving mission for driving the automated vehicle from a first point to another point along a desired travelling path. However, a driving mission may also be defined as a driving mission for starting operation of the automated vehicle and also as a driving mission for ending, or stopping, operation of the automated vehicle. As such, a driving mission may for example be a mission to initiate driving of the automated vehicle from standstill. A driving mission may also be a driving mission for initiating any one of a forward driving operation and a reverse driving operation.

Optionally, when the specific driving mission is a driving mission with a limited sensor field of view which is defined by a predefined sensor field of view threshold, the control system may be configured to select an obstacle detection mode in which at least obstacle detection of an area along the intended travelling path which is not covered by the sensor field of view is disabled, such as all obstacle detection is disabled. By disabling obstacle detection of an area not covered by the sensor field of view is herein meant that any information relating to the probability that an obstacle is present in the area is ignored. Furthermore, by disabling all obstacle detection is herein meant that any information relating to the probability that an obstacle is present nearby the vehicle along the intended travelling path is ignored. By the provision of disabling obstacle detection as mentioned in the above, a dead-lock situation may be prevented. For example, the specific driving mission with the limited sensor field of view may be an at least partly reverse moving driving mission. It has been realized that for some reverse moving driving missions, the sensor field of view may be limited so that certain areas behind the automated vehicle may not be covered by the sensors. Thereby, by e.g. disabling all obstacle detection in such a situation, the vehicle will be able to conduct the driving mission, even though the sensor field of view is limited. It has for example been realized that this situation may occur when the automated vehicle is a towing vehicle which tows a trailer, and where the trailer at least partly occludes the sensor field of view.

Optionally, when the specific driving mission is a start-up driving mission where the automated vehicle initiates driving from standstill, the control system may be configured to select an obstacle detection mode in which at least obstacle detection of an area along the intended travelling path which is not covered by the sensor field of view is disabled, such as all obstacle detection is disabled. Thereby, a dead-lock situation may be prevented. It has also been realized that when initiating driving from standstill, an area adjacent the vehicle may not be covered by the sensors. As a consequence, a control system utilizing a relatively high obstacle detection accuracy may prevent the automated vehicle from initiating driving since it is unknown if the adjacent area is free from obstacles or not. In other words, the control system utilizing the high obstacle detection accuracy may not be able to exclude that an obstacle may be present in the adjacent area. Accordingly, by e.g. disabling all obstacle detection in such situation, the automated vehicle can start driving, even if the obstacle detection sensor(s) has/have not covered the adjacent area.

Optionally, when the specific area of operation corresponds to a known travelling path for which it is known that the ground surface is drivable, the control system may be configured to select an obstacle detection mode in which it only is detected if the intended travelling path is free from obstacles or not. Thereby, for example, less processing power may be required when driving along the known travelling path. This implies faster system reaction times and/or reduced need of processing power. Accordingly, if it is known that the ground surface is drivable, the control system may not investigate if the ground surface is undrivable, such as the ground surface includes potholes etc. Rather, the control system may only investigate if obstacles are located on the ground surface or not. Such obstacles may be other vehicles, vulnerable road users (VRU) etc.

Optionally, when the specific area of operation corresponds to a travelling path for which it is not known if the ground surface is drivable, the control system may be configured to select an obstacle detection mode in which it is detected if the ground surface is drivable and if the intended travelling path is free from obstacles or not. This implies increased safety when the automated vehicle is driving along an unknown travelling path.

Optionally, the plurality of predefined obstacle detection modes may comprise at least two different obstacle detection modes with varying obstacle detection accuracy, wherein a first mode, defined as a high accuracy mode, is configured to detect if the ground surface is drivable and/or if the intended travelling path is free from obstacles or not, and wherein an additional mode, defined as a mode with a lower accuracy than the first mode, is configured to at least disable obstacle detection for areas uncovered by the one or more obstacle detection sensors, such as configured to disable all obstacle detection. By using at least two such obstacle detection modes, a more versatile control system is achieved where the most suitable mode can be selected for a specific driving mission and/or area of operation. Still optionally, the plurality of predefined obstacle detection modes may comprise at least three different obstacle detection modes with varying obstacle detection accuracy, wherein a first mode, defined as a high accuracy mode, is configured to detect if the ground surface is drivable and if the intended travelling path is free from obstacles or not, wherein a second mode, defined as a mode with a lower accuracy than the first mode, is configured to detect if the intended travelling path is free from obstacles or not, and wherein a third mode, defined as a mode with a lower accuracy than the second mode, is configured to at least disable obstacle detection for areas uncovered by the one or more obstacle detection sensors, such as configured to disable all obstacle detection. For example, the second obstacle detection mode may be configured to only detect if the intended travelling path is free from obstacles or not. By using at least three such obstacle detection modes, a more versatile control system is achieved where the most suitable mode can be selected for a specific driving mission and/or area of operation. The above-mentioned additional mode may thus correspond to the third mode.

Optionally, a lower level of accuracy, such as when disabling all obstacle detection, may imply a lower allowable vehicle speed during manoeuvring of the automated vehicle. Accordingly, the control system may manoeuvre the vehicle at a lower vehicle speed when a mode with a lower accuracy is used. This implies increased operation safety. For example, when starting from standstill, or when reversing, as mentioned in the above, the maximum allowed vehicle speed may correspond to 10 km/h or less, such as 5 km/h or less. By way of example, the allowed vehicle speed may correspond to walking speed in such situations.

Optionally, at least one of the plurality of predefined obstacle detection modes may utilize an occupancy grid comprising a plurality of cells representing sub-areas of the environment around the automated vehicle, wherein a cell is considered to be occupied when an obstacle is detected in the cell and/or when it is detected that the ground surface in the cell is not drivable. Furthermore, for example, a cell may be considered to be occupied also when the cell has not been covered by any obstacle detection sensor, or if a specific time period has lapsed since the last time the cell was covered by any obstacle detection sensor. By using an occupancy grid, detection of obstacles may be facilitated, implying reduced processing power and/or faster processing. It shall be noted that also other representations of the surroundings with respect to the automated vehicle may additionally or alternatively be used by the control system. Also for these representations of the surroundings, uncovered areas may be classified as occupied. As such, according to an example embodiment of the present invention, the control system may be configured to classify uncovered areas as occupied, thereby not allowing the vehicle to be driven in those areas. An uncovered area is an area which has not been covered by the one or more obstacle detection sensors. Additionally, or alternatively, an uncovered area may be an area which has not been covered by the one or more obstacle detection sensors during a specific time period since a last time the area was covered by the one or more obstacle detection sensors.

Optionally, at least one specific area of operation may be a predefined area of operation on a site, wherein a specific obstacle detection mode from the plurality of predefined obstacle detection modes is preselected for the at least one predefined area of operation. This implies a more efficient operation of the vehicle where the control system, without hesitation, can use the preselected mode when entering the predefined area of operation. For example, the control system may be configured to switch between different preselected modes when the automated vehicle drives from one predefined area of operation to another predefined area of operation on the site.

Still optionally, in response to obtaining an instruction to conduct a specific driving mission in the at least one predefined area of operation for which a specific obstacle detection mode has been preselected, and when the instruction is indicative of overriding the preselected obstacle detection mode, the control system may be configured to at least temporarily replace the preselected obstacle detection mode by an obstacle detection mode based on the specific driving mission. Thereby, a more versatile control system may be achieved. For example, by being able to override the preselected obstacle detection mode, dead-lock situations may be avoided.

Thus, there is provided a method for manoeuvring an automated vehicle by use of input from one or more obstacle detection sensors which are configured to detect if an intended travelling path of the automated vehicle is free from obstacles or not during manoeuvring of the automated vehicle.

The method comprises:
  utilizing a plurality of predefined obstacle detection modes during manoeuvring of the automated vehicle, wherein the plurality of predefined obstacle detection modes have different levels of obstacle detection accuracy, and
  selecting a specific obstacle detection mode from the plurality of predefined obstacle detection modes based on a specific driving mission and/or based on a specific area of operation for the automated vehicle so that the specific obstacle detection mode is used during the specific driving mission and/or in the specific area of operation.

Advantages and effects of embodiments of the second aspect of the invention are analogous to the advantages and effects of embodiments of the first aspect of the invention, and vice versa. It shall also be noted that all embodiments of the first aspect of the invention are combinable with all embodiments of the second aspect of the invention, and vice versa.

Optionally, when the specific driving mission is a driving mission with a limited sensor field of view which is defined by a predefined sensor field of view threshold, the method may comprise selecting an obstacle detection mode in which at least obstacle detection of an area along the intended travelling path which is not covered by the sensor field of view is disabled, such as all obstacle detection is disabled.

Optionally, the specific driving mission with the limited sensor field of view may be an at least partly reverse moving driving mission.

Optionally, when the specific driving mission is a start-up driving mission where the automated vehicle initiates driving from standstill, the method may comprise selecting an obstacle detection mode in which at least obstacle detection of an area along the intended travelling path which is not covered by the sensor field of view is disabled, such as all obstacle detection is disabled.

Optionally, when the specific area of operation corresponds to a known travelling path for which it is known that the ground surface is drivable, the method may comprise selecting an obstacle detection mode in which it only is detected if the intended travelling path is free from obstacles or not.

Optionally, when the specific area of operation corresponds to a travelling path for which it is not known if the ground surface is drivable, the method may comprise selecting an obstacle detection mode in which it detects if the ground surface is drivable and if the intended travelling path is free from obstacles or not.

Optionally, in response to obtaining an instruction to conduct a specific driving mission in the at least one predefined area of operation for which a specific obstacle detection mode has been preselected, and when the instruction is indicative of overriding the preselected obstacle detection mode, the method may further comprise at least temporarily replacing the preselected obstacle detection mode by an obstacle detection mode based on the specific driving mission.

Thus, there is provided control unit for manoeuvring an automated vehicle by use of input from one or more obstacle detection sensors which are configured to detect if an intended travelling path of the automated vehicle is free from obstacles or not during manoeuvring of the automated vehicle. The control unit is configured to perform the steps of the method according to any one of the embodiments of the second aspect of the invention. Accordingly, the method is preferably a computer implemented method.

According to a fourth aspect of the invention, the object is at least partly achieved by a vehicle comprising a control system according to any one of the embodiments of the first aspect of the invention and/or a control unit according to any one of the embodiments of the third aspect of the invention.

The vehicle is preferably a transport vehicle for transporting goods. For example, the vehicle may be a truck, such as a heavy-duty truck, a bus, a working machine etc. The vehicle is preferably a vehicle which is configured to be used in a confined area.

According to a fifth aspect of the invention, the object is at least partly achieved by a computer program comprising program code means for performing the steps of any embodiment of the second aspect of the invention when said program is run on a computer, such as on the control unit according to the third aspect of the invention.

According to a sixth aspect of the invention, the object is at least partly achieved by a computer readable medium carrying a computer program comprising program code means for performing the steps of any embodiment of the second aspect of the invention when said program product is run on a computer, such as on the control unit according to the third aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
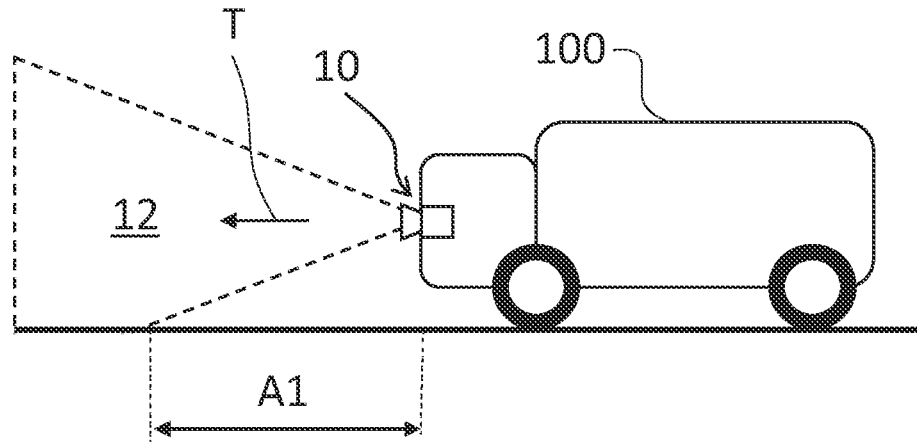
FIG. 1 is a schematic side view of a vehicle comprising a control system according to an example embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

FIG. 1 depicts a schematic side view of a vehicle 100 according to an example embodiment of the present invention. The vehicle 100 is here in the form of a truck. It shall however be noted that according to the invention the vehicle may not only be a truck, but may be of any other type, such as a bus, construction equipment, such as a wheel loader, a dump truck, an excavator etc. In particular, the vehicle 100 is an automated vehicle which is adapted to be operated in a confined area, such as a terminal area, a mining site, a construction site, a port or the like. Accordingly, the vehicle 100 may not be adapted to be operated in a public road network.

As shown, the vehicle 100 comprises an obstacle detection sensor 10. In this embodiment, the obstacle detection sensor 10 is directed in a forward direction of the vehicle 100 and is configured to detect if an intended travelling path of the automated vehicle 100 is free from obstacles or not during manoeuvring of the automated vehicle 100.

The obstacle detection sensor 10 may be of any suitable type, such as any one of a LIDAR (Light Detection And Ranging) sensor, a RADAR (Radio Detection And Ranging) sensor, a camera and an ultrasonic sensor.

The obstacle detection sensor 10 has a field of view 12 (indicated by a triangle with dashed lines).

Figure 2:
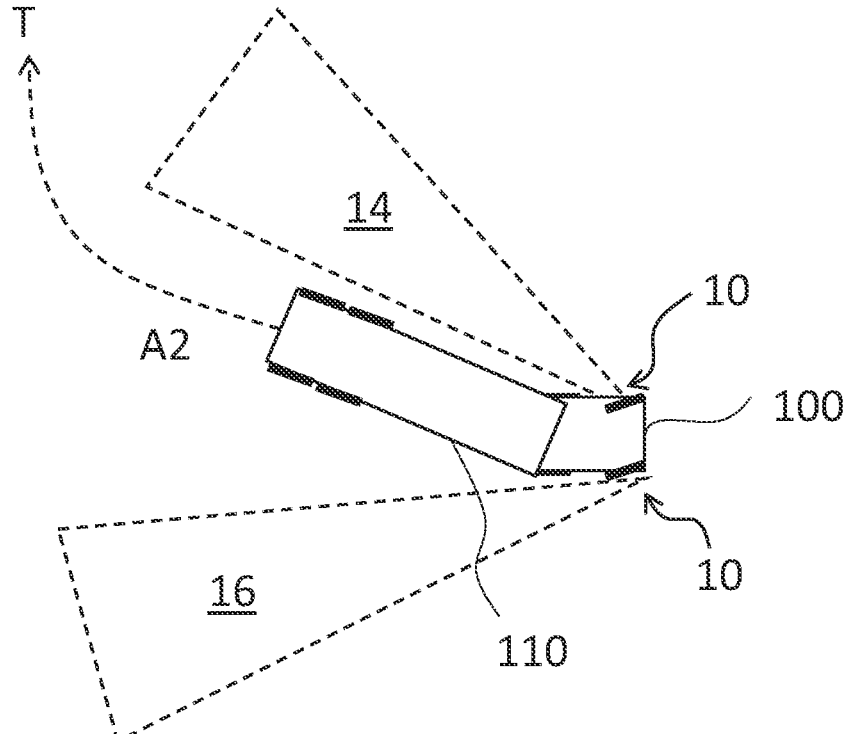
FIG. 2 is a schematic view from above of a vehicle combination comprising a vehicle according to an example embodiment of the present invention.

Referring to FIG. 2, a schematic view from above of a vehicle 100 according to an example embodiment of the invention is shown. In this embodiment, the vehicle 100 is a towing vehicle which is towing a trailer 110. Accordingly, the vehicle 100 and the trailer 110 together form a vehicle combination. The vehicle 100 comprises first and second obstacle detection sensors 10 which are provided on separate sides of the vehicle 100 and which are directed rearwardly. As shown, each sensor 10 has a respective field of view 14, 16 (indicated by triangles with dashed lines).

Figure 4:
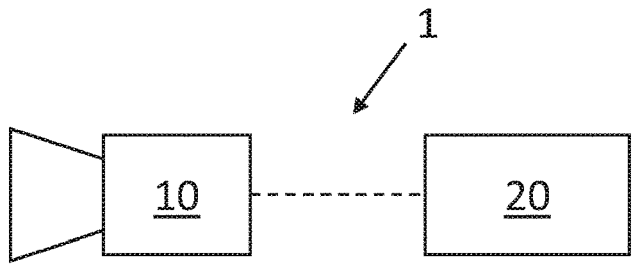
FIG. 4 is a schematic view of a control system according to an example embodiment of the present invention.

Each vehicle 100 as shown in FIGS. 1 and 2 comprises a control system 1 as e.g. shown in FIG. 4. More specifically, each vehicle 100 comprises at least one obstacle detection sensor 10 which is communicatively connected to a control unit 20. The control system 1 is configured to manoeuvre the vehicle 100 along an intended travelling path by use of information from the sensors 10. For example, the control system 1 may be configured to initiate control signals to one or more actuators (not shown) for controlling at least one of steering, braking and propulsion of the vehicle 100.

The control unit 20 is herein an electronic control unit. It may comprise processing circuitry which is adapted to run a computer program as disclosed herein. The control unit 20 may comprise hardware and/or software for performing the method according to the second aspect of the disclosure. In an embodiment the control unit 20 may be denoted a computer. The control unit 20 may be constituted by one or more separate sub-control units. In addition, the control unit 20 may communicate with the at least one obstacle detection sensor 10 by use of wired and/or wireless communication means. This is indicated by a dashed line in FIG. 4. Still further, even though the control unit 20 preferably is a vehicle on-board control unit, it shall be noted that the control unit 20 may additionally or alternatively be a vehicle off-board control unit, such as a control unit being part of a computer cloud system.

Accordingly, the control system 1 is a control system 1 for manoeuvring an automated vehicle 100. The control system 1 comprises one or more obstacle detection sensors 10 which are configured to detect if an intended travelling path of the automated vehicle 100 is free from obstacles or not during manoeuvring of the automated vehicle 10.

The control system 1 is further configured to utilize a plurality of predefined obstacle detection modes during manoeuvring of the automated vehicle 100, wherein the plurality of predefined obstacle detection modes have different levels of obstacle detection accuracy.

The control system 1 is further configured to select a specific obstacle detection mode from the plurality of predefined obstacle detection modes based on a specific driving mission and/or based on a specific area of operation for the automated vehicle 100 so that the specific obstacle detection mode is used during the specific driving mission and/or in the specific area of operation.

Referring to FIG. 1, the specific driving mission may be a start-up driving mission where the automated vehicle 100 initiates driving from standstill. As such, when the specific driving mission is a start-up driving mission, the control system 1 may be configured to select an obstacle detection mode in which at least obstacle detection of an area A1 along the intended travelling path T, which is not covered by the sensor field of view 12, is disabled. By way of example, all obstacle detection may be disabled. Thereby, at least the area A1 which is not covered by the obstacle detection sensor 10 at start-up can be ignored by the control system 1. As a result, a possible dead-lock situation can be avoided. However, if the control system 1 would consider the area A1, it would not be able to exclude that an obstacle may be present in the area A1 since the area A1 is not covered by the sensor 10 in its field of view 12. By the present invention, this type of situation can be avoided.

As another example, referring to FIG. 2, when the specific driving mission is a driving mission with a limited sensor field of view which is defined by a predefined sensor field of view threshold, the control system 1 may be configured to select an obstacle detection mode in which at least obstacle detection of an area A2 along the intended travelling path T, which is not covered by the sensor field of view 14, 16 is disabled, such as all obstacle detection is disabled. In FIG. 2, the specific driving mission with the limited sensor field of view is an at least partly reverse moving driving mission. As shown, the trailer 110 occludes the area A2 behind the trailer 110. In a similar vein as described in the above, if the control system 1 would consider the area A2, it would not be able to exclude that an obstacle may be present in the area A2 since the area A2 is not covered by the sensors 10. Accordingly, it may result in a dead-lock situation where the vehicle 100 is prevented from being moved. By the present invention, also this type of situation can be avoided.

According to another example, when the specific area of operation corresponds to a known travelling path for which it is known that the ground surface is drivable, the control system 1 may be configured to select an obstacle detection mode in which it only is detected if the intended travelling path is free from obstacles or not. Thus, only obstacles which are provided on the ground surface, and not forming part of the ground surface, may be detected, whilst other obstacles are ignored. For example, the control system 1 may be configured to utilize an obstacle detection mode in which it is only detected if the intended travelling path is free from obstacles such as other vehicles, VRU's or the like, e.g. movable objects.

Still further, as yet another example, when the specific area of operation corresponds to a travelling path for which it is not known if the ground surface is drivable, the control system 1 may be configured to select an obstacle detection mode in which it is detected if the ground surface is drivable and if the intended travelling path is free from obstacles or not.

The plurality of predefined obstacle detection modes may comprise at least two different obstacle detection modes with varying obstacle detection accuracy, wherein a first mode, defined as a high accuracy mode, is configured to detect if the ground surface is drivable and/or if the intended travelling path is free from obstacles or not, and wherein an additional mode, defined as a mode with a lower accuracy than the first mode, is configured to at least disable obstacle detection for areas uncovered by the one or more obstacle detection sensors 10, such as being configured to disable all obstacle detection. For example, the plurality of predefined obstacle detection modes may comprise at least three different obstacle detection modes with varying obstacle detection accuracy, wherein a first mode, defined as a high accuracy mode, is configured to detect if the ground surface is drivable and if the intended travelling path is free from obstacles or not, wherein a second mode, defined as a mode with a lower accuracy than the first mode, is configured to detect if the intended travelling path is free from obstacles or not, and wherein a third mode, defined as a mode with a lower accuracy than the second mode, is configured to at least disable obstacle detection for areas uncovered by the one or more obstacle detection sensors 10, such as being configured to disable all obstacle detection. The third mode may in this example correspond to the above-mentioned additional mode.

Preferably, a lower level of accuracy, such as when disabling all obstacle detection, implies a lower allowable vehicle speed during manoeuvring of the automated vehicle 100. Thereby, safer manoeuvring of the automated vehicle 100 is provided when the obstacle detection accuracy is reduced.

Figure 3:
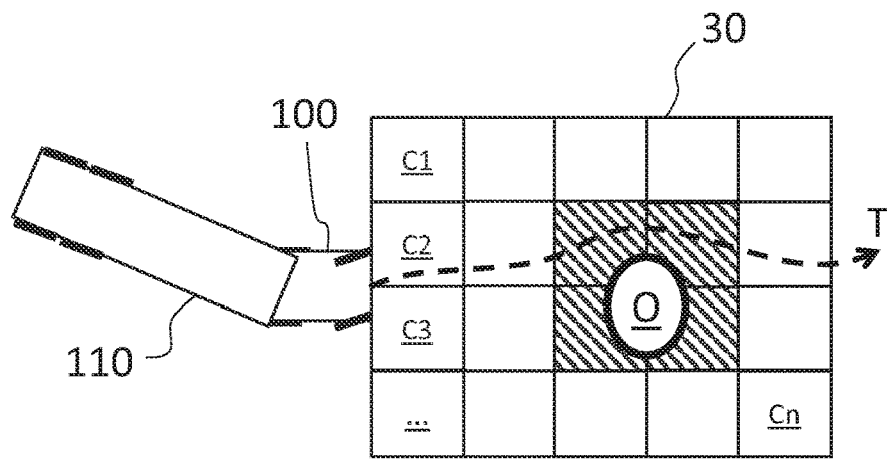
FIG. 3 is a schematic view from above of a vehicle comprising a control system according to an example embodiment of the present invention.

FIG. 3 depicts a schematic view of a vehicle 100 and a trailer 110 from above according to an example embodiment of the invention when the control system 1 is utilizing an occupancy grid 30. More specifically, at least one of the plurality of predefined obstacle detection modes may utilize an occupancy grid 30 comprising a plurality of cells C1, . . . , Cn representing sub-areas of the environment around the automated vehicle 100. Accordingly, the occupancy grid 30 is a representation of the surrounding environment with respect to the vehicle 100. A cell is considered to be occupied when an obstacle O is detected in the cell and/or when it is detected that the ground surface in the cell is not drivable. In the shown example, the obstacle O is detected in four cells, meaning that the control system 1 will determine that the four cells are occupied. Accordingly, the control system 1 may try to avoid the four cells during manoeuvring of the vehicle 100 along an intended travelling path T. For example, the vehicle 100 may perform an additional vehicle manoeuvre so that the four cells are avoided. In other words, the intended travelling path T may be adjusted so that it does not pass any one of the four occupied cells. Furthermore, a cell may be considered to be occupied also when the cell has not been covered by any obstacle detection sensor, or if a specific time period has lapsed since the last time the cell was covered by any obstacle detection sensor. Still further, according to an example embodiment, each cell may be associated with two values, one which is related to if there is an obstacle or not in the cell and another one which is related to if the ground surface in the cell is drivable or not.

Moreover, at least one specific area of operation may be a predefined area of operation on a site, wherein a specific obstacle detection mode from the plurality of predefined obstacle detection modes is preselected for the at least one predefined area of operation. Still further, in response to obtaining an instruction to conduct a specific driving mission in the at least one predefined area of operation for which a specific obstacle detection mode has been preselected, and when the instruction is indicative of overriding the preselected obstacle detection mode, the control system 1 may be configured to at least temporarily replace the preselected obstacle detection mode by an obstacle detection mode based on the specific driving mission.

Figure 5:
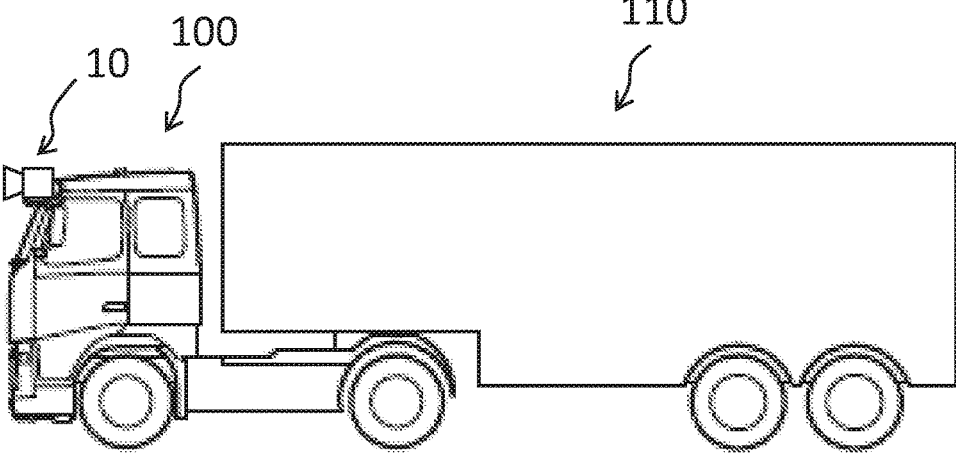
FIG. 5 is a side view of a vehicle combination comprising a vehicle according to an example embodiment of the present invention.

The vehicles 100 and trailers 110 as shown in FIGS. 2 and 3 may for example be a truck and trailer combination as shown in FIG. 5. FIG. 5 depicts a side view of a towing vehicle 100 and a trailer 110, in this case a so-called semi-trailer. The shown obstacle detection sensor 10 is here provided close to the windshield of the vehicle 100. Even though the vehicle 100 is configured to be automatically driven along a travelling path, it may also be configured to be manually driven.

Figure 6:
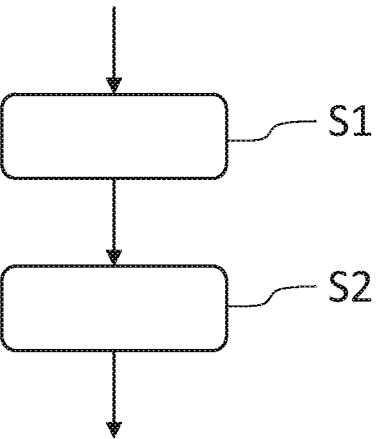
FIG. 6 is a flowchart of a method according to an example embodiment of the present invention.

The present invention also relates to a method for manoeuvring an automated vehicle 100 by use of input from one or more obstacle detection sensors 10 which are configured to detect if an intended travelling path of the automated vehicle 100 is free from obstacles or not during manoeuvring of the automated vehicle 100. FIG. 6 shows a flowchart of an example embodiment of such a method.

The method comprises:

S1: utilizing a plurality of predefined obstacle detection modes during manoeuvring of the automated vehicle 100, wherein the plurality of predefined obstacle detection modes have different levels of obstacle detection accuracy, and S2: selecting a specific obstacle detection mode from the plurality of predefined obstacle detection modes based on a specific driving mission and/or based on a specific area of operation for the automated vehicle 100 so that the specific obstacle detection mode is used during the specific driving mission and/or in the specific area of operation.

As an example, when the specific driving mission is a driving mission with a limited sensor field of view which is defined by a predefined sensor field of view threshold, the method may comprise selecting an obstacle detection mode in which at least obstacle detection of an area along the intended travelling path which is not covered by the sensor field of view is disabled, such as all obstacle detection is disabled. The specific driving mission with the limited sensor field of view may be an at least partly reverse moving driving mission.

Moreover, as another example, when the specific driving mission is a start-up driving mission where the automated vehicle initiates driving from standstill, the method may comprise selecting an obstacle detection mode in which at least obstacle detection of an area along the intended travelling path which is not covered by the sensor field of view is disabled, such as all obstacle detection is disabled.

When the specific area of operation corresponds to a known travelling path for which it is known that the ground surface is drivable, the method may comprise selecting an obstacle detection mode in which it only is detected if the intended travelling path is free from obstacles or not.

When the specific area of operation corresponds to a travelling path for which it is not known if the ground surface is drivable, the method may comprise selecting an obstacle detection mode in which it detects if the ground surface is drivable and if the intended travelling path is free from obstacles or not.

At least one specific area of operation may be a predefined area of operation on a site, wherein a specific obstacle detection mode from the plurality of predefined obstacle detection modes is preselected for the at least one predefined area of operation. Moreover, in response to obtaining an instruction to conduct a specific driving mission in the at least one predefined area of operation for which a specific obstacle detection mode has been preselected, and when the instruction is indicative of overriding the preselected obstacle detection mode, the method may further comprise at least temporarily replacing the preselected obstacle detection mode by an obstacle detection mode based on the specific driving mission.

As mentioned in the above, the plurality of predefined obstacle detection modes may comprise at least two different obstacle detection modes with varying obstacle detection accuracy, wherein a first mode, defined as a high accuracy mode, is configured to detect if the ground surface is drivable and/or if the intended travelling path is free from obstacles or not, and wherein an additional mode, defined as a mode with a lower accuracy than the first mode, is configured to at least disable obstacle detection for areas uncovered by the one or more obstacle detection sensors 10, such as being configured to disable all obstacle detection. For example, the plurality of predefined obstacle detection modes may comprise at least three different obstacle detection modes with varying obstacle detection accuracy, wherein a first mode, defined as a high accuracy mode, is configured to detect if the ground surface is drivable and if the intended travelling path is free from obstacles or not, wherein a second mode, defined as a mode with a lower accuracy than the first mode, is configured to detect if the intended travelling path is free from obstacles or not, and wherein a third mode, defined as a mode with a lower accuracy than the second mode, is configured to at least disable obstacle detection for areas uncovered by the one or more obstacle detection sensors 10, such as being configured to disable all obstacle detection. The third mode may in this example correspond to the above-mentioned additional mode.

The control unit 20 as mentioned in the above may thus be configured to perform the method as disclosed herein. Accordingly, the control unit 20 is used for manoeuvring an automated vehicle 100 by use of input from one or more obstacle detection sensors 10 which are configured to detect if an intended travelling path of the automated vehicle 100 is free from obstacles or not during manoeuvring of the automated vehicle 100.

The control unit 20 may for example utilize a computer program and/or computer readable medium as disclosed herein.

It is to be understood that the present invention is not limited to the embodiments described above and illustrated in the drawings; rather, the skilled person will recognize that many changes and modifications may be made within the scope of the appended claims.

The invention claimed is:

1. A control system for manoeuvring an automated vehicle, wherein the control system comprises one or more obstacle detection sensors which are configured to detect if an intended travelling path of the automated vehicle is free from obstacles or not during manoeuvring of the automated vehicle, wherein the one or more obstacle detection sensors has a field of view, and wherein the control system is further configured to utilize a plurality of predefined obstacle detection modes during manoeuvring of the automated vehicle, wherein the plurality of predefined obstacle detection modes have different levels of obstacle detection accuracy, wherein, the control system is further configured to select a specific obstacle detection mode from the plurality of predefined obstacle detection modes based on a specific driving mission and/or based on a specific area of operation for the automated vehicle so that the specific obstacle detection mode is used during the specific driving mission and/or in the specific area of operation, wherein the plurality of predefined obstacle detection modes comprises at least two different obstacle detection modes with varying obstacle detection accuracy, wherein a first mode, defined as a high accuracy mode, is configured to detect if the ground surface is drivable and/or if the intended travelling path is free from obstacles or not, and wherein an additional mode, defined as a mode with a lower accuracy than the first mode, is configured to disable obstacle detection for areas uncovered by the field of view of the one or more obstacle detection sensors and enable obstacle detection for areas covered by the field of view of the one or more obstacle detection sensors.

2. The control system according to claim 1, wherein, when the specific driving mission is a driving mission with a limited sensor field of view which is defined by a predefined sensor field of view threshold, the control system is configured to select an obstacle detection mode in which at least obstacle detection of an area along the intended travelling path which is not covered by the sensor field of view is disabled.

3. The control system according to claim 2, wherein the specific driving mission with the limited sensor field of view is an at least partly reverse moving driving mission.

4. The control system according to claim 1, wherein, when the specific driving mission is a start-up driving mission where the automated vehicle initiates driving from standstill, the control system is configured to select an obstacle detection mode in which at least obstacle detection of an area along the intended travelling path which is not covered by the sensor field of view is disabled.

5. The control system according to claim 1, wherein, when the specific area of operation corresponds to a known travelling path for which it is known that the ground surface is drivable, the control system is configured to select an obstacle detection mode in which it only is detected if the intended travelling path is free from obstacles or not.

6. The control system according to claim 1, wherein, when the specific area of operation corresponds to a travelling path for which it is not known if the ground surface is drivable, the control system is configured to select an obstacle detection mode in which it is detected if the ground surface is drivable and if the intended travelling path is free from obstacles or not.

7. A vehicle comprising a control system according to claim 1 and a control unit.

8. The control system according to claim 1, wherein the plurality of predefined obstacle detection modes comprises at least three different obstacle detection modes with varying obstacle detection accuracy, wherein a first mode, defined as a high accuracy mode, is configured to detect if the ground surface is drivable and if the intended travelling path is free from obstacles or not, wherein a second mode, defined as a mode with a lower accuracy than the first mode, is configured to detect if the intended travelling path is free from obstacles or not, and wherein a third mode, defined as a mode with a lower accuracy than the second mode, is configured to at least disable obstacle detection for areas uncovered by the one or more obstacle detection sensors.

9. The control system according to claim 1, wherein a lower level of accuracy implies a lower allowable vehicle speed during manoeuvring of the automated vehicle.

10. The control system according to claim 1, wherein at least one of the plurality of predefined obstacle detection modes utilizes an occupancy grid comprising a plurality of cells representing sub-areas of the environment around the automated vehicle, wherein a cell is considered to be occupied when an obstacle is detected in the cell and/or when it is detected that the ground surface in the cell is not drivable.

11. The control system according to claim 1, wherein at least one specific area of operation is a predefined area of operation on a site, wherein a specific obstacle detection mode from the plurality of predefined obstacle detection modes is preselected for the at least one predefined area of operation.

12. The control system according to claim 11, wherein, in response to obtaining an instruction to conduct a specific driving mission in the at least one predefined area of operation for which a specific obstacle detection mode has been preselected, and when the instruction is indicative of overriding the preselected obstacle detection mode, the control system is configured to at least temporarily replace the preselected obstacle detection mode by an obstacle detection mode based on the specific driving mission.

13. A method for manoeuvring an automated vehicle by use of input from one or more obstacle detection sensors which are configured to detect if an intended travelling path of the automated vehicle is free from obstacles or not during manoeuvring of the automated vehicle, wherein the one or more obstacle detection sensors has a field of view, the method comprising:

utilizing a plurality of predefined obstacle detection modes during manoeuvring of the automated vehicle, wherein the plurality of predefined obstacle detection modes have different levels of obstacle detection accuracy, and selecting a specific obstacle detection mode from the plurality of predefined obstacle detection modes based on a specific driving mission and/or based on a specific area of operation for the automated vehicle so that the specific obstacle detection mode is used during the specific driving mission and/or in the specific area of operation, wherein the plurality of predefined obstacle detection modes comprises at least two different obstacle detection modes with varying obstacle detection accuracy, wherein a first mode, defined as a high accuracy mode, is configured to detect if the ground surface is drivable and/or if the intended travelling path is free from obstacles or not, and wherein an additional mode, defined as a mode with a lower accuracy than the first mode, is configured to disable obstacle detection for areas uncovered by the field of view of the one or more obstacle detection sensors and enable obstacle detection for areas covered by the field of view of the one or more obstacle detection sensors.

14. The method according to claim 13, wherein, when the specific driving mission is a driving mission with a limited sensor field of view which is defined by a predefined sensor field of view threshold, the method comprises selecting an obstacle detection mode in which at least obstacle detection of an area along the intended travelling path which is not covered by the sensor field of view is disabled.

15. The method according to claim 14, wherein the specific driving mission with the limited sensor field of view is an at least partly reverse moving driving mission.

16. The method according to claim 13, wherein, when the specific driving mission is a start-up driving mission where the automated vehicle initiates driving from standstill, the method comprises selecting an obstacle detection mode in which at least obstacle detection of an area along the intended travelling path which is not covered by the sensor field of view is disabled.

17. The method according to claim 13, wherein, when the specific area of operation corresponds to a known travelling path for which it is known that the ground surface is drivable, the method comprises selecting an obstacle detection mode in which it only is detected if the intended travelling path is free from obstacles or not.

18. The method according to claim 13, wherein, when the specific area of operation corresponds to a travelling path for which it is not known if the ground surface is drivable, the method comprises selecting an obstacle detection mode in which it detects if the ground surface is drivable and if the intended travelling path is free from obstacles or not.

19. A non-transitory computer readable medium carrying a non-transitory computer program comprising program code for performing the method according to claim 13 when said program product is run on a computer.

20. The method according to claim 13, wherein the plurality of predefined obstacle detection modes comprises at least three different obstacle detection modes with varying obstacle detection accuracy, wherein a first mode, defined as a high accuracy mode, is configured to detect if the ground surface is drivable and if the intended travelling path is free from obstacles or not, wherein a second mode, defined as a mode with a lower accuracy than the first mode, is configured to detect if the intended travelling path is free from obstacles or not, and wherein a third mode, defined as a mode with a lower accuracy than the second mode, is configured to at least disable obstacle detection for areas uncovered by the one or more obstacle detection sensors.

21. The method according to claim 13, wherein a lower level of accuracy implies a lower allowable vehicle speed during manoeuvring of the automated vehicle.

22. The method according to claim 13, wherein at least one of the plurality of predefined obstacle detection modes utilizes an occupancy grid comprising a plurality of cells representing sub-areas of the environment around the automated vehicle, wherein a cell is considered to be occupied when an obstacle is detected in the cell and/or when it is detected that the ground surface in the cell is not drivable.

23. The method according to claim 13, wherein at least one specific area of operation is a predefined area of operation on a site, wherein a specific obstacle detection mode from the plurality of predefined obstacle detection modes is preselected for the at least one predefined area of operation.

24. The method according to claim 23, wherein, in response to obtaining an instruction to conduct a specific driving mission in the at least one predefined area of operation for which a specific obstacle detection mode has been preselected, and when the instruction is indicative of overriding the preselected obstacle detection mode, the method further comprises at least temporarily replacing the preselected obstacle detection mode by an obstacle detection mode based on the specific driving mission.

25. A control unit for manoeuvring an automated vehicle by use of input from one or more obstacle detection sensors which are configured to detect if an intended travelling path of the automated vehicle is free from obstacles or not during manoeuvring of the automated vehicle, the control unit being configured to perform the steps of the method according to claim 13.

* * * * *